March 26, 1935. E. E. HEWITT 1,995,807
FLUID PRESSURE BRAKE
Filed March 28, 1931
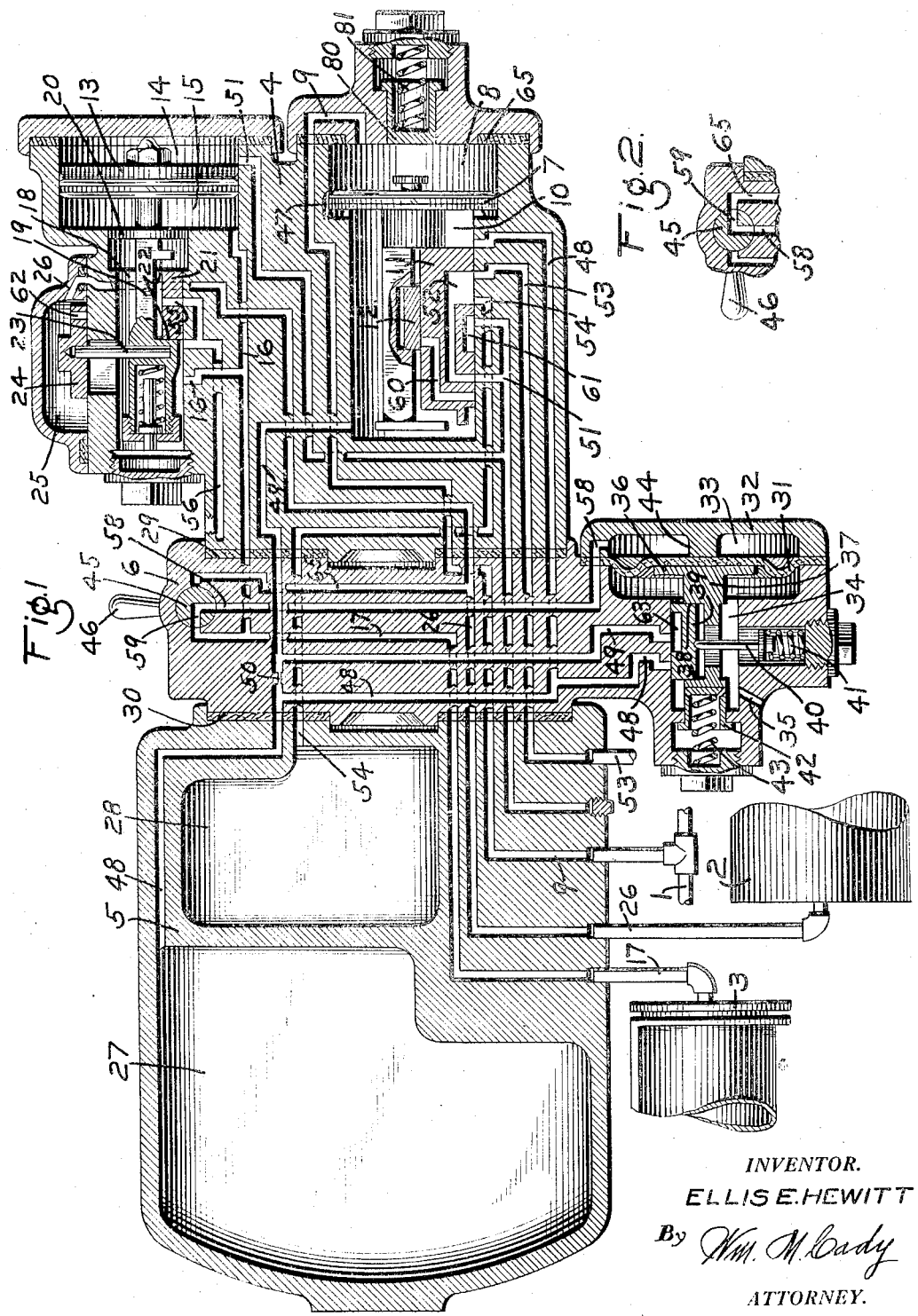
INVENTOR.
ELLIS E. HEWITT
By Wm. M. Cady
ATTORNEY.

Patented Mar. 26, 1935

1,995,807

UNITED STATES PATENT OFFICE 1,995,807

FLUID PRESSURE BRAKE

Ellis E. Hewitt, Edgewood, Pa., assignor to The Westinghouse Air Brake Company, Wilmerding, Pa., a corporation of Pennsylvania Application March 28, 1931, Serial No. 525,941

13 Claims. (Cl. 303—40)

This invention relates to fluid pressure brakes, and more particularly to the type in which the brakes are applied by effecting a reduction in brake pipe pressure.

To effect an application of the brakes on a train, the usual brake valve device on the locomotive is turned to a brake applying position for effecting a reduction in brake pipe pressure. The brake pipe reduction is first effective at the head end of the train and as a result, the brakes on the train apply serially from the front toward the rear and set up a retardation on cars at the front of the train, which causes the slack in the train to run in and often results in excessive shocks.

The principal object of my invention is to provide improved means for retarding the application of the brakes on the locomotive for a predetermined time interval after the reduction in brake pipe pressure is initiated, so that the inertia of the locomotive will tend to keep the slack in the train pulled out, and thus avoid excessive shocks.

Other objects and advantages will appear in the following more detailed description of my invention.

In the accompanying drawing; Fig. 1 is a diagrammatic sectional view of a portion of a locomotive brake equipment embodying my invention; and Fig. 2 is a fragmentary view showing the cut-out valve portion of the equipment shown in Fig. 1 but with the cut-out valve shown in another position.

As shown in the drawing, the locomotive brake equipment comprises a brake controlling valve device such as a distributing valve device associated with the usual brake pipe 1, main reservoir 2 and brake cylinder 3.

The distributing valve device comprises a valve portion 4, a reservoir or chamber portion 5, and an intermediate or filler portion 6.

The valve portion of the distributing valve device comprises an equalizing portion and an application portion. The equalizing portion comprises an equalizing piston 7 having at one side a chamber 8 connected to the brake pipe 1 by a passage 9 and having at the other side a valve chamber 10 containing a main slide valve 11 and an auxiliary slide valve 12 adapted to be operated by said piston. The application portion comprises a piston 13 having at one side a chamber 14 and at the other side a chamber 15 open to the brake cylinder 3 through passage 16, and passage and pipe 17. Extending to the left from piston 13 and through a valve chamber 18 is a piston stem 19 having mounted thereon a baffle piston 20 separating chambers 15 and 18. An exhaust slide valve 21 is disposed in chamber 18 between spaced shoulders 22 on the stem 19 and is adapted to be operated thereby. Projecting upwardly from the stem 19 is a driving pin 23 operatively engaging an application slide valve 24 contained in a chamber 25, which at all times is open to the main reservoir 2 through passage and pipe 26.

The reservoir or chamber portion 5 of the distributing valve device is provided with a pressure chamber 27 and an application chamber 28.

The filler portion 6 is preferably interposed between the valve portion and the chamber portion of the distributing valve device and is provided with gasket faces 29 and 30 adapted to register with corresponding gasket faces of the valve portion and chamber portion, respectively.

The filler portion 6 contains a hold back valve device and a hold back cut-out valve device. The hold back valve device comprises a movable abutment preferably in the form of a flexible diaphragm 31, the outer annular portion of which is clamped between the casing and a cover plate 32. Said diaphragm has at one side a chamber 33 and at the opposite side a chamber 34 open to the atmosphere at all times through a passage 35. Disposed in chamber 34 and engaging the diaphragm 31 is a diaphragm follower plate 36 having a stem 37 provided with a pair of spaced shoulders 38. Disposed between the shoulders 38 is a slide valve 39 adapted to be moved by deflection of said diaphragm, said slide valve being pressed into engagement with its seat by a rocking pin 40 which is acted upon by a spring 41.

A plunger 42 is slidably mounted in a wall in chamber 34 and is acted upon by a spring 43 for urging said plunger, the slide valve 39 and diaphragm 31 to the normal position shown in the drawing, in which position the diaphragm is adapted to engage a stop lug 44 in the cover plate 32.

The hold back cut-out valve device comprises a plug valve 45 rotatably mounted in the filler portion and having two operative positions, one position shown in Fig. 1 and the other position shown in Fig. 2, said plug valve being adapted to be turned from one position to the other by means of an operating handle 46.

In operation, fluid under pressure is supplied to the brake pipe 1 in the usual manner and flows from the brake pipe through pipe and passage 9 to the equalizing piston chamber 8.

With the equalizing piston 7 in the normal or release position, as shown in the drawing, fluid under pressure flows from piston chamber 8 through a feed groove 47 to valve chamber 10 and from thence through a passage 48 to the pressure chamber 27. Fluid under pressure also flows from the valve chamber 10 through passage 49, and a choke 50 to the passage 48, so that the chamber 27 is charged with fluid at brake pipe pressure.

The application piston chamber 14 is normally connected to the atmosphere through passage 51, leading to the seat of the equalizing slide valve 11, cavity 52 in said slide valve and an atmospheric passage and pipe 53, and the application chamber 28 being connected to cavity 52 through a passage 54 is also normally at atmospheric pressure.

With the application piston chamber 14 thus at atmospheric pressure, the application piston 13, slide valve 24 and exhaust slide valve 21 assume the position shown in the drawing, as will be hereinafter fully explained, in which position, the brake cylinder 3 is open to the atmosphere through pipe and passage 17, passage 16, exhaust valve chamber 18, port 55 in the exhaust slide valve 21 and an atmospheric passage 56.

Diaphragm chamber 33 of the hold back valve device is connected through passage 58 and a port 59 in the plug valve 45 to the brake cylinder passage 17, which is open to the atmosphere, as above described, and as a result, the pressure of spring 43 holds the diaphragm 31 and slide valve 39 in the position shown in the drawing, in which the passages 48 and 49 are lapped.

The main reservoir 2 is charged with fluid under pressure in the usual manner and fluid flows therefrom through pipe and passage 26 to the application valve chamber 25.

When a gradual reduction in brake pipe pressure is effected, the pressure of fluid in valve chamber 10 shifts the equalizing piston 7 and slide valves 11 and 12 toward the right hand to service position, in which said piston engages the stop 80 which is subject to the pressure of spring 81. This movement of piston 7 initially shifts the auxiliary slide valve 12 relative to slide valve 11 so as to uncover the service port 60, after which, further movement of said piston moves both of said slide valves to service position. The unrestricted communication through passage 48 from the pressure chamber 27 to the equalizing valve chamber 10 is thus maintained open until the main slide valve 11 is moved, so that the displacement of piston 7 in moving the slide valve 12 relative to slide valve 11 does not cause any appreciable reduction in pressure in the valve chamber 10. As a result, sufficient pressure is maintained in valve chamber 10 to shift the piston 7 and slide valves 11 and 12 to service position in which passage 48 is lapped by the slide valve 11, but restricted communication is at all times maintained between the pressure chamber 27 and valve chamber 10 through passage 49 and choke 50.

In service position of the equalizing slide valve 11, the service port 60 registers with passage 51, and due to the initial movement of the piston 7 and auxiliary slide valve 12 relative to the main slide valve 11, the service port is uncovered by said auxiliary slide valve. This permits fluid under pressure to flow from the valve chamber 10, which is in communication with pressure chamber 27 through passage 49, choke 50 and passage 48, to passage 51 leading to the application piston chamber 14 and connected to the application chamber 28 through cavity 61 in the slide valve 11 and passage 54. In this manner, fluid under pressure is gradually supplied from the pressure chamber 27 to the application piston chamber 14 and application chamber 28 at a rate governed by the flow area of choke 50.

The gradual build up of pressure in the application piston chamber 14 moves the application piston 13 toward the left hand, thereby shifting the exhaust slide valve 21 so as to lap the atmospheric passage 56, after which a port 62 in the application slide valve 24 is gradually opened to chamber 18. This permits fluid under pressure supplied from the main reservoir 2 to valve chamber 25 to flow to the exhaust valve chamber 18 and from thence through passage 16 and passage and pipe 17 to the brake cylinder 3, thereby initiating an application of the brakes.

The pressure of fluid in the exhaust valve chamber 18 and brake cylinder 3 builds up substantially together and at substantially the same rate as the build up of pressure in the application piston chamber 14. If the build up of brake cylinder pressure tends to exceed the rate of build up in the application piston chamber 14, the fluid at brake cylinder pressure supplied through passage 16 to chamber 15 shifts the application piston 13 toward the right hand and thus moves the application valve 24 so as to partially close the supply port 62 and thus retard the build up of brake cylinder pressure. It will be thus apparent that the brake cylinder pressure will build up at substantially the same rate as the pressure builds up in the application piston chamber 14, which is controlled by the flow area of choke 50 and the volume of the application chamber 28.

The hold back valve diaphragm chamber 33 being connected through passage 58 and port 59 in the plug valve 45 to the brake cylinder passage 17 is also supplied with fluid at brake cylinder pressure and the pressure in said chamber builds up with the pressure in the brake cylinder 3. When a predetermined pressure is thus obtained in the brake cylinder 3 and diaphragm chamber 33, the diaphragm 31 is deflected toward the left hand against the resisting pressure of spring 43 and into engagement with the casing. This movement of the diaphragm 31 shifts the slide valve 39 to a position in which a cavity 63 in said slide valve connects passage 48 from the pressure chamber 27 to passage 49 leading to the equalizing valve chamber 10. These passages, thus connected through the cavity 63, provide an unrestricted by-pass around the choke 50, thus increasing the rate at which fluid under pressure is supplied from the pressure chamber 27 to the valve chamber 10. With the choke 50 thus rendered ineffective, the flow of fluid under pressure to the application piston chamber 14 and application chamber 28 is increased to the standard rate as governed by the flow area of the service port 60. This increased rate of supply to the application piston chamber 14 moves the application piston 13 and slide valve 24 further to the left, thereby increasing the opening through the port 62 to the valve chamber 18, so as to permit the pressure in said chamber and in the brake cylinder 3 to build up more rapidly and at the increased rate of build up in the application piston chamber 14.

If, instead of a gradual reduction in brake pipe pressure being effected, as hereinbefore described, the brake pipe pressure is suddenly reduced, the equalizing piston 7 and slide valves 11 and 12 at first move only to service position, as hereinbefore described, for the reason that the venting of fluid under pressure from the valve chamber 10 through the service port 60 so far exceeds the rate of supply to said chamber through the choke 50 that the pressure in valve chamber 10 is not sufficiently higher than the reduced pressure in piston chamber 8 to effect the movement of the piston 7 so as to move the stop 80 against the resistance of the spring 81. However, when the pressure in the brake cylinder 3 and connected diaphragm chamber 33 builds up at the retarded rate to a degree sufficient to move the hold back slide valve 37 to its left hand position so as to open the by-pass around choke 50, the increased rate of supply of fluid under pressure to the equalizing valve chamber 10 shifts the equalizing piston 7 and slide valves 11 and 12 to emergency position against the pressure of spring 81, in which position, said piston engages the gasket 65.

In emergency position of the equalizing slide valve 11, passage 54 from the application chamber 28 is lapped, and passage 51 is uncovered by the left hand end of said slide valve, so that fluid under pressure from the pressure chamber 27 is permitted to rapidly flow to the application piston chamber 14 and build up a higher pressure in said chamber than obtained in a service application of the brakes, due to the fact that in a service application of the brakes, fluid under pressure flows from the pressure chamber 27 to the application chamber 28 as well as the application piston chamber 14, whereas in emergency position, the application chamber 28 is cut off, so that the pressure chamber 27 equalizes into the application piston chamber only.

As hereinbefore described, the application piston 13 responds to the rate of build up of pressure in the piston chamber 14 to supply fluid to the brake cylinder at substantially the same rate, so that in emergency, after the initial retarded build up of brake cylinder pressure, the rate of supply to the brake cylinder is increased to substantially that to the application piston chamber 14 and the degree of pressure obtained in the brake cylinder is substantially equal to the degree of pressure obtained in said chamber.

It will be noted that when an emergency reduction in brake pipe pressure is effected, the build up of brake cylinder pressure is initially retarded to the same degree and builds up at the same rate as in effecting a service application of the brakes, but after the operation of the hold back valve device, the higher emergency brake cylinder pressure is obtained at an emergency rate.

To effect a release of the brakes after an application, fluid under pressure is supplied to the brake pipe in the usual manner. When the pressure in the equalizing piston chamber 8 is thus increased above the reduced pressure in the equalizing valve chamber 10, the equalizing piston 7 and slide valves 11 and 12 are shifted to their release position, as shown in the drawing, In release position, the valve chamber 10 and presseure chamber 27 are charged with fluid under pressure supplied to valve chamber 10 through the feed groove 47 in the same manner as in initially charging.

In release position of the equalizing slide valve 11, fluid under pressure is vented from the application piston chamber 14 through passage 51, cavity 52 in the slide valve 11, and the atmospheric passage and pipe 53. The application chamber 28 is also opened to the atmosphere through passage 54 and cavity 52.

Upon venting fluid under pressure from the application piston chamber 14, brake cylinder pressure acting in chamber 15 on the opposite side of the application piston 13, shifts said piston and the slide valves 24 and 21 to the release position shown in the drawing, and in which fluid under pressure is vented from the brake cylinder 3 to the atmosphere through pipe and passage 17, passage 16, exhaust valve chamber 18 and atmospheric passage 56, thereby effecting a release of the brakes.

The hold back diaphragm chamber 33 being connected to the brake cylinder passage 17 through passage 58 and port 59 in the plug valve 45, fluid under pressure is also vented from said chamber with the venting of fluid under pressure from the brake cylinder. This venting of fluid under pressure from diaphragm chamber 33 permits the pressure of spring 43 to shift the slide valve 39 and deflect the diaphragm 31 to their normal positions in which passages 48 and 49 are both lapped by the slide valve 39.

It will be noted, that in effecting an application of the brakes, when the hold back diaphragm 31 and slide valve 39 are moved to their left hand position and passages 48 and 49 are connected through cavity 63 so as to form a by-pass around the choke 50, the distributing valve device operates in the usual well known manner. If, for any reason, it is desired to cut out the hold back feature and permit the distributing valve device to operate in the well known manner without initially retarding the application of the locomotive brakes, the plug valve 45 may be turned by the handle 46 from the position shown in Fig. 1 to the position shown in Fig. 2. In the latter position of plug valve 45, the port 59 connects passage 58 from the diaphragm chamber 31 to passage 65 leading to passage 26 from the main reservoir 2, and consequently permits fluid at main reservoir pressure to flow to the diaphragm chamber 33. The main reservoir pressure in chamber 33 deflects the diaphragm 31 and shifts the slide valve 39 to the left hand position and holds them in this position in which the by-pass around choke 50 through passage 48, cavity 63 in the slide valve 39 and passage 49 is maintained open, thus rendering the choke 50 ineffective to retard an application of the locomotive brakes so long as the plug valve 45 is in the position shown in Fig. 2.

It will be evident that the equalizing portion of the distributing valve device may be arranged to supply fluid under pressure directly to the brake cylinder instead of to the application piston chamber 14, and the claims are intended to include both the direct and indirect supply of fluid to the brake cylinder.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, and a brake cylinder, of valve means operative by fluid under pressure for supplying fluid under pressure to said brake cylinder at a service or an emergency rate for effecting an application of the brakes, a reservoir, an equalizing valve device operative upon a service reduction in brake pipe pressure to supply fluid under pressure from said reservoir to said valve means at a service rate and upon an emergency reduction in brake pipe pressure to supply fluid under pressure from said reservoir to said valve means at an emergency rate, a choke for initially restricting the rate at which fluid under pressure is supplied from said reservoir to said valve means by the operation of said equalizing valve device, and a hold back valve device operative upon a predetermined build up of pressure in said brake cylinder for establishing an unrestricted communication around said choke.

2. In a fluid pressure brake, the combination with a brake pipe, and a brake cylinder, of valve means operative upon a service reduction in brake pipe pressure to supply fluid under pressure to said brake cylinder at a service rate, and operative upon an emergency reduction in brake pipe pressure to supply fluid under pressure to said brake cylinder at an emergency rate, means for initially restricting the flow of fluid to said brake cylinder upon a service reduction in brake pipe pressure and upon an emergency reduction in brake pipe pressure, to a degree less than said service rate, and a valve device operative upon a predetermined build up of pressure in said brake cylinder for rendering said means ineffective.

3. In a fluid pressure brake, the combination with a brake pipe and a brake cylinder, of valve means movable to service position upon a service reduction in brake pipe pressure for supplying fluid under pressure to said brake cylinder at a service rate, means for initially retarding the supply of fluid under pressure to said brake cylinder through said valve means, and a valve device operative by a predetermined brake cylinder pressure for rendering said means ineffective, said valve means being movable to emergency position upon an emergency reduction in brake pipe pressure for supplying fluid under pressure to said brake cylinder at an emergency rate, said means being adapted to temporarily stop said valve device in service position in its traverse to emergency position until after the operation of said valve device.

4. In a fluid pressure brake, the combination with a brake pipe and a brake cylinder, of valve means operative upon a reduction in brake pipe pressure to supply fluid under pressure to said brake cylinder for effecting an application of the brakes, control means normally in communication with said brake cylinder and governed by the pressure of fluid in said brake cylinder for at first restricting the supply of fluid to the brake cylinder and then increasing the rate at which fluid is supplied to said brake cylinder, and manually operable means for closing said communication for rendering said control means ineffective to restrict the supply of fluid to said brake cylinder.

5. In a fluid pressure brake, the combination with a brake pipe and a brake cylinder, of valve means operative upon a reduction in brake pipe pressure to supply fluid under pressure to said brake cylinder for effecting an application of the brakes, control means governed by the pressure of fluid in said brake cylinder for at first restricting the supply of fluid to the brake cylinder and then increasing the rate at which fluid is supplied to said brake cylinder, a reservoir, and manually operable means for supplying fluid under pressure from said reservoir to said control means for rendering said control means ineffective to restrict the supply of fluid under pressure to said brake cylinder.

6. In a fluid pressure brake, the combination with a brake pipe and a brake cylinder, of valve means operative upon a reduction in brake pipe pressure to supply fluid under pressure to said brake cylinder for effecting an application of the brakes, control means governed by the pressure of fluid in said brake cylinder for at first restricting the supply of fluid to the brake cylinder and then increasing the rate at which fluid is supplied to said brake cylinder, a reservoir, and a manually operable valve having one position for controlling communication through which fluid under pressure is supplied from said brake cylinder to said control means and another position for supplying fluid under pressure from said reservoir to said control means for rendering said control means ineffective to restrict the supply of fluid under pressure to said brake cylinder.

7. In a fluid pressure brake system, the combination with a train brake pipe, of a locomotive fluid pressure brake apparatus comprising a brake controlling valve device operated upon either a service or an emergency reduction in brake pipe pressure for supplying fluid under pressure to effect an application of the brakes, and means operative to initially restrict the rate, at which said valve device supplies fluid under pressure, to a predetermined degree regardless of the rate of reduction in brake pipe pressure, and then permit flow at a rate dependent upon the rate of reduction in brake pipe pressure.

8. In a fluid pressure brake system, the combination with a train brake pipe, of a locomotive fluid pressure brake apparatus comprising a brake cylinder, a brake controlling valve device operated upon either a service or an emergency reduction in brake pipe pressure for supplying fluid under pressure to the brake cylinder, and means for first limiting the rate at which said valve device supplies fluid under pressure to the brake cylinder, to thereby initially retard the application of the brakes on the locomotive, and for then permitting the supply of fluid to the brake cylinder at a more rapid rate dependent upon the rate of reduction in brake pipe pressure.

9. In a fluid pressure brake, the combination with a brake pipe, a brake cylinder and a reservoir normally charged with fluid under pressure, of valve means communicating with said reservoir and operative upon a reduction in brake pipe pressure to supply fluid under pressure from said reservoir to effect a supply of fluid to said brake cylinder, choke means in the communication from said reservoir to said valve means, and means operated upon a predetermined increase in brake cylinder pressure for opening a by-pass around said choke means.

10. In a fluid pressure brake, the combination with a brake pipe and a locomotive brake cylinder, of valve means on the locomotive operative upon either a service or an emergency reduction in brake pipe pressure to effect the supply of fluid under pressure to said brake cylinder, means for initially restricting the rate of said supply to thereby initially apply the locomotive brakes at a slow rate, and means controlled by the pressure of fluid in said brake cylinder for increasing the rate at which fluid under pressure is supplied to said brake cylinder.

11. In a fluid pressure brake, the combination with a brake pipe and a locomotive brake cylinder, of valve means on the locomotive operative upon either a service or an emergency reduction in brake pipe pressure to effect the supply of fluid under pressure to said brake cylinder, means for initially restricting the rate of said supply to thereby initially apply the locomotive brakes at a slow rate, and means operative upon a predetermined build up of pressure in said brake cylinder for increasing the rate at which fluid under pressure is supplied to said brake cylinder.

12. In a fluid pressure brake equipment for a locomotive, the combination with a brake pipe and a brake cylinder, of a valve device having a chamber and operative according to the rate of increase in pressure in said chamber to supply fluid under pressure to said brake cylinder at a corresponding rate, valve means operative upon a service rate of reduction in brake pipe pressure to establish a communication through which fluid under pressure is adapted to be supplied to said chamber at a service rate, a choke for restricting the supply of fluid through said communication to said chamber to a rate less than said service rate, and means controlled by the pressure of fluid in said brake cylinder and operative upon a predetermined increase in brake cylinder pressure for rendering said choke ineffective.

13. In a fluid pressure brake equipment for a locomotive, the combination with a brake pipe and a brake cylinder, of a valve device having a chamber and operative according to the rate of increase in pressure in said chamber to supply fluid under pressure to said brake cylinder at a corresponding rate, valve means operative upon an emergency rate of reduction in brake pipe pressure to establish a communication through which fluid under pressure is adapted to be supplied to said brake cylinder at an emergency rate, a choke for restricting the supply of fluid through said communication to said chamber to a rate less than a service rate, and means controlled by the pressure of fluid in said brake cylinder and operative upon a predetermined increase in brake cylinder pressure for rendering said choke ineffective.

ELLIS E. HEWITT.